Dec. 31, 1968 V. M. MATHEWS, JR., ET AL 3,419,710

MAGNETIC CARD READER HAVING SEQUENTIAL INDICIA SENSING MEANS

Filed April 2, 1965 Sheet 1 of 2

INVENTORS.
Victor M. Mathews Jr.
Crayton D. Benton
BY
Hovey, Schmidt, Johnson & Hovey.
ATTORNEYS.

INVENTOR.
Victor M. Mathews Jr.
Crayton D. Benton
BY
Hovey, Schmidt, Johnson & Hovey,
ATTORNEYS.

᠎United States Patent Office 3,419,710
Patented Dec. 31, 1968

3,419,710
MAGNETIC CARD READER HAVING SEQUENTIAL INDICIA SENSING MEANS

Victor M. Mathews, Jr., Leawood, and Crayton D. Benton, Shawnee, Kans., assignors to MKC Electronics Corporation, Kansas City, Kans., a corporation of Missouri Filed Apr. 2, 1965, Ser. No. 445,078
19 Claims. (Cl. 235—61.11)

ABSTRACT OF THE DISCLOSURE

In an information handling system, a card is employed bearing information in the form of magnetic indicia selectively disposed in certain of a total number of bit locations arranged on the card in columns and rows. A card reader is provided having a read head assembly comprising a pair of spaced heads mounting a plurality of magnets and reed switches disposed with each magnet and its corresponding switch mounted on opposite heads in opposed relationship to each other. The card is carried by a tray that travels between the heads with the card oriented such that each magnet and switch scans a corresponding column of the card.

This invention relates generally to information-handling systems and, more specifically, to apparatus for reading a card or the like containing information in the form of indicia which is magnetically detectable.

With the rapid development of information-handling systems in recent years, a number of means have been devised for reading information in numerous forms carried by a card or the like. An example of an information bearing card in widespread use is the well-known punched card having holes therein arranged in a pattern representing predetermined information. Cards of this type, as well as others of different construction, are read by a reading block or head having sensors which determine the presence or absence of the holes at a matrix of locations on the card.

Manifestly, a reading head which senses all of the indicia carried by an information-bearing card in one operation must, of necessity, be relatively complex and contain sensors of miniaturized dimensions. Furthermore, the expense of an information-handling system is a primary consideration in commercial applications, both in the initial expense of the equipment and in maintenance and operational costs subsequent to installation. Hence, a reduction in the complexity of the reader apparatus is requisite if systems of lower cost are to be produced since the reader forms the basic component of any information-handling system.

Therefore, the instant invention is directed to providing a card reader which is less complex than conventional card readers utilizing the block reading scheme, in order that the cost of such apparatus may be materially reduced, both as to the reader itself and the system as a whole. The primary object of the invention is to provide a card reader which reads the information borne by the card in a sequential manner rather than simultaneously.

As a corollary to the foregoing, it is also an object of the instant invention to provide a card or the like having a series of information bearing zones wherein each zone contains indicia comprising a portion of the total information carried by the card. In this manner, the card is adapted for scanning of the zones thereof in succession by a read head.

It is another object of the instant invention to provide a card reader having a pair of magnetically intercoupled read heads which respond to a change in the degree of magnetic coupling therebetween, in order that indicia on an information-bearing card capable of affecting a magnetic field may be detected by the heads.

Still another object of the instant invention is to provide the aforesaid pair of heads with magnetically responsive, bistate switching means operable to change state in the presence of magnetic indicia carried by an information-bearing card.

A further object of this invention is to provide a card reader having a shiftable tray for receiving the card and a pair of opposed, stationary read heads disposed to scan successive information-bearing zones of the card upon movement of the tray along a predetermined path of travel between the opposed heads.

An additional object of the instant invention is to provide apparatus as set forth in the last-mentioned object in conjunction with electrical circuitry responsive to movement of the carrier for transmitting a series of read signals to a memory as said zones are scanned by the read heads.

Still another object of the instant invention is to provide electrical circuitry as aforesaid which will effect simultaneous readout of the information stored in the memory after such information has been sequentially transferred thereinto from the card.

Yet another object of the present invention is to provide information-handling apparatus for use in a product-dispensing system wherein a customer identification card or the like having a series of information bearing zones containing indicia identifying the consumer is utilized and such identification information is sequentially read therefrom and transferred to a memory for subsequent simultaneous readout, and wherein production consumption information is also obtained and sequentially transferred to the memory for subsequent simultaneous readout.

Other objects will become apparent as the detailed description proceeds.

*The reader mechanism*

Referring particularly to FIGS. 1–4 and 6, the numeral 10 designates a chassis which supports a horizontally reciprocable carrier 12 comprising a flat, elongated plate having downturned, longitudinal edges forming the same into an inverted U-shaped configuration. Chassis 10 and carrier 12 are fabricated from aluminum or other suitable nonmagnetic material.

Figure 4:
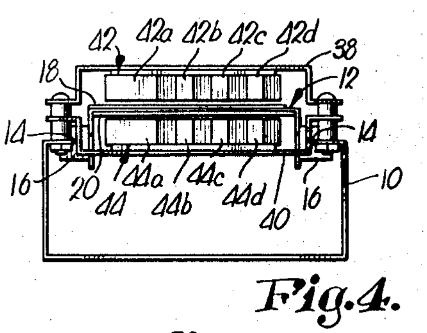
FIG. 4 is an end view of the reader showing the relationship between the card-receiving tray and the read heads, certain components being removed for clarity.

FIGURE 4 reveals that chassis 10 is of box-like configuration having an open top defined by opposed, longitudinal, marginal edges 14. Each edge 14 defines a guide which receives a pair of spaced-apart, grooved blocks 16 rigid with a corresponding side of carrier 12. Thus, two blocks 16 are disposed on each side of carrier 12 and slide in respective guides 14 to render carrier 12 horizontally reciprocable.

Figure 1:
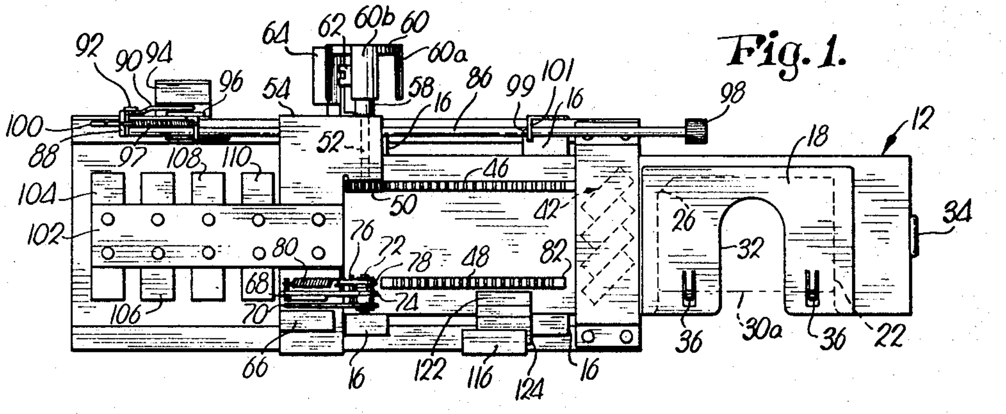
FIG. 1 is a top plan view of the card reader.
Figure 2:
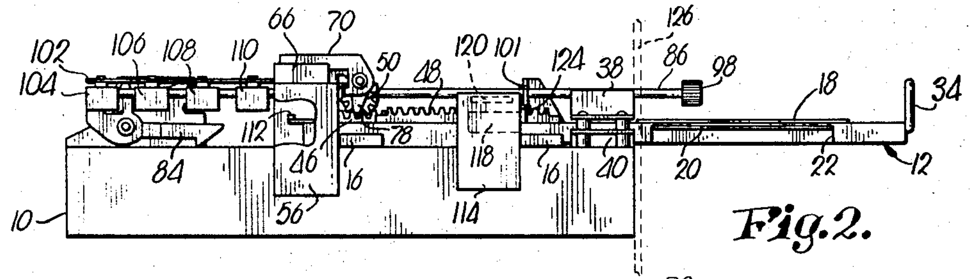
FIG. 2 is a side elevational view of the reader.

A rectangular plate 18 overlies the horizontal surface of carrier 12 adjacent the right end thereof, as viewed in FIGS. 1 and 2, and another plate 20 underlies the carrier beneath plate 18. A cut-out 22 in carrier 12 between the opposed plates 18 and 20 defines a slot between the plates for receiving an information bearing card 24 illustrated diagramatically in FIG. 5. Thus, the plates 18 and 20 form a tray for receiving the card and maintaining the same in place on carrier 12 during reciprocation thereof. Cutout 22 is shown by broken lines in FIG. 1, and it may be observed that the cutout is of rectangular configuration except for corner 26 thereof. This corresponds to the clipped corner 28 of card 24 thereby assuring that the card will be fully inserted into the slot between the plates in only one position.

Card 24 is of rectangular configuration except for corner 28 and has a longitudinal edge 30 which is illustrated in FIG. 1 by a broken line **30*a*. Line 30*a* illustrates the disposition of edge 30 when the card is fully inserted into the slot between plates 18 and 20 to its proper position therewithin. In order to facilitate insertion and removal of the card, plates 18 and 20 are cutaway at 32 to permit the fingers of the operator to insert and remove the card. Additionally, an upstanding tab 34 is provided at the extreme right-hand end of carrier 12, as viewed in FIGS. 1 and 2, to facilitate manual reciprocation of carrier 12**.

It will become apparent hereinafter that it is important that card 24 be maintained properly seated between plates 18 and 20 during operation of the apparatus. Therefore, means, such as a pair of leaf springs 36 formed from the material of plate 18, may be employed to hold the card in place. Springs 36 bear against the edge 30 of card 24 when the same is properly seated.

Chassis 10 mounts a pair of vertically spaced brackets 38 and 40 adjacent the left-hand end of the card-receiving tray formed by plates 18 and 20 and the cutout 22. It should be understood at this juncture that carrier 12 is shown in its normal or stand-by position prior to movement thereof to effect operation of the reading apparatus in a manner to be described hereinafter. Bracket 38 supports an upper read head 42, while bracket 40 mounts a lower read head 44. The two heads 42 and 44 are disposed in spaced-apart opposed relationship to one another with the space therebetween being aligned with the path of travel of the card tray, as is evident in FIG. 4. Thus, leftward movement of carrier 12 from the stand-by position shown in FIGS. 1 and 2, will carry card 24 through the space between the heads.

A pair of racks 46 and 48 are rigidly secured to the upper surface of carrier 12 and extend longitudinally thereof. Rack 46 is engaged by a pinion 50 rigid with one end of a shaft 52 journaled in a sheet metal mounting bracket 54 attached to chassis 10 and extending thereabove. Bracket 54 is of generally inverted, U-shaped configuration and has a pair of depending legs 56 which are rigidly secured to respective sides of the chassis. Shaft 52 extends through a sleeve 58, a shield assembly 60 being rigid with the outer end of the shaft and rotatable therewith. The sleeve 58 extends coaxially with the shaft and is rigid with bracket 54, the sleeve serving to mount a U-shaped, permanent magnet 62 within shield assembly 60.

A magnetically responsive reed switch 64 is mounted on the bracket leg 56 adjacent magnet 62. It may be seen that shield assembly 60 is provided with four shield components **60*a*, 60*b*, 60*c* and 60*d* which move between magnet 62 and switch 64 during rotation of shaft 52. These components are composed of magnetic material and are angularly spaced from one another so that switch 64 will be sequentially operated upon rotation of shaft 52** in a manner to be fully described hereinafter.

Figure 6:
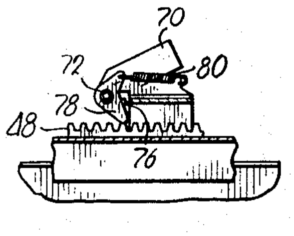
FIG. 6 is a detailed, fragmentary view looking in the same direction as FIG. 3 and showing the magnetic switch assembly which controls energization of the read signal-producing circuit.

A magnetically responsive reed switch 66 is mounted on the opposite side of bracket 54, together with a bar magnet 68 for controlling operation thereof. A member 70 of magnetic material is disposed between switch 66 and magnet 68 for rotation about a stub shaft 72 journaled in a mounting arm 74 extending from bracket 54. Member 70 is provided with a laterally extending projection 76 which is engageable by a dog 78 pivotally mounted on stub shaft 72. A spring 80 is connected to dog 78 and biases the latter in a clockwise direction as viewed in FIG. 6 (counterclockwise as viewed in FIG. 2). It should be understood that the fragmentary showing of FIG. 6 illustrates member 70 in its raised position permitting magnetic coupling of magnet 68 and reed switch 66, such position being assumed upon movement of the card-receiving tray of carrier 12 toward heads 42 and 44, whereupon rack 48 is brought into engagement with the lowermost extremity of dog 78.

Once dog 78 has been engaged by rack 48, carrier 12 cannot be returned to the stand-by position shown because of engagement of the lowermost extremity of the dog with adjacent teeth of the rack. However, once carrier 12 reaches its final position, dog 78 is freed from rack 48 due to passage of its end 82 therebeneath. However, at this time, the block 16, shown underlying shaft 52 in FIG. 1 when carrier 12 is in the stand-by position, will be brought into underlying relationship with a pawl 84 which hooks over the block to maintain the carrier in its final position after dog 78 has reached end 82 of rack 48. A horizontal rod 86 is shiftable longitudinally to release pawl 84 and permit return movement of the carrier to the stand-by position.

Figure 3:
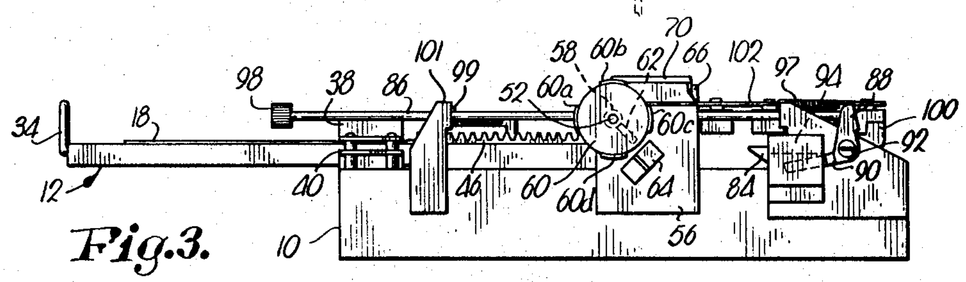
FIG. 3 is a side elevational view of the reader looking at the opposite side thereof as compared with FIG. 2.

The action of rod 86 is especially apparent in FIG. 3 wherein it may be seen that one end of the rod bears against an ear 88 which forms a part of a gate 90 composed of magnetic material. The ear and gate swing about a pivot 92, gate 90 being disposed for movement between a magnetically responsive reed switch 94 and a bar magnet 96 (FIG. 1).

A spring 98 is connected to the upper extremity of ear 88 and biases the latter in a counterclockwise direction about pivot 92 as viewed in FIG. 3. Spring 98 thus holds ear 88 against the proximal end of rod 86, movement of the rod being limited by an enlargement 99 thereon which abuts a guide 101 receiving the rod to serve as a stop to normally maintain rod 86, ear 88 and gate 90 in the positions shown. The other end of rod 86 is provided with a knob 98, the rod being mounted for longitudinal movement upon the application of pressure to knob 98 by the operator. Rightward movement of rod 86 (as viewed in FIG. 3) pushes ear 88 to the right into engagement with an upstanding lug 100 rigid with pawl 84. Pawl 84 is also mounted for movement about pivot 92; therefore, engagement of ear 88 with lug 100 raises the hooked tip of the pawl away from carrier 12 and out of engagement with the block 16.

A horizontal plate 102 extends leftwardly from the top of bracket 54 (as viewed in FIGS. 1 and 2) and suspends four spaced-apart, magnetic reed switches 104, 106, 108 and 110. These switches are sequentially operated by a magnet 12 (FIG. 2) on the left end of carrier 12 upon movement of the latter.

An upstanding plate 114 secured to one side of chassis 10 is provided with a horizontal lip 116 at its upper extremity and serves as a means for mounting a magnetically responsive reed switch 118 and a bar magnet 120. In FIG. 1, the lip 116 hides switch 118 and magnet 120 from view. Carrier 12 is provided with a plate of magnetic material extending longitudinally of the carrier adjacent rack 48, such plate having an upstanding section 122 secured to the upper surface of the carrier, and an integral horizontal section 124 extending between magnet 120 and switch 118 when the carrier is in the position shown. It will be appreciated that movement of the carrier will shift plate section 124 leftwardly as viewed in FIGS. 1 and 2 until, ultimately, the magnetic plate will no longer be disposed between magnet 120 and switch 118, thereby permitting the magnet to operate the switch in a manner to be discussed hereinafter.

In FIG. 2, a panel 126 is illustrated in broken lines, it being contemplated that the apparatus will be contained in a housing (not shown) with the card-receiving tray and knob 98 extending from panel 126 so that the same is accessible to the operator. It should be understood that, since a number of magnetically operated reed switches are employed in the apparatus, the various metallic parts, including the housing, should be composed of a nonmagnetic material such as aluminum or brass.

Figures 7, 8, 9:
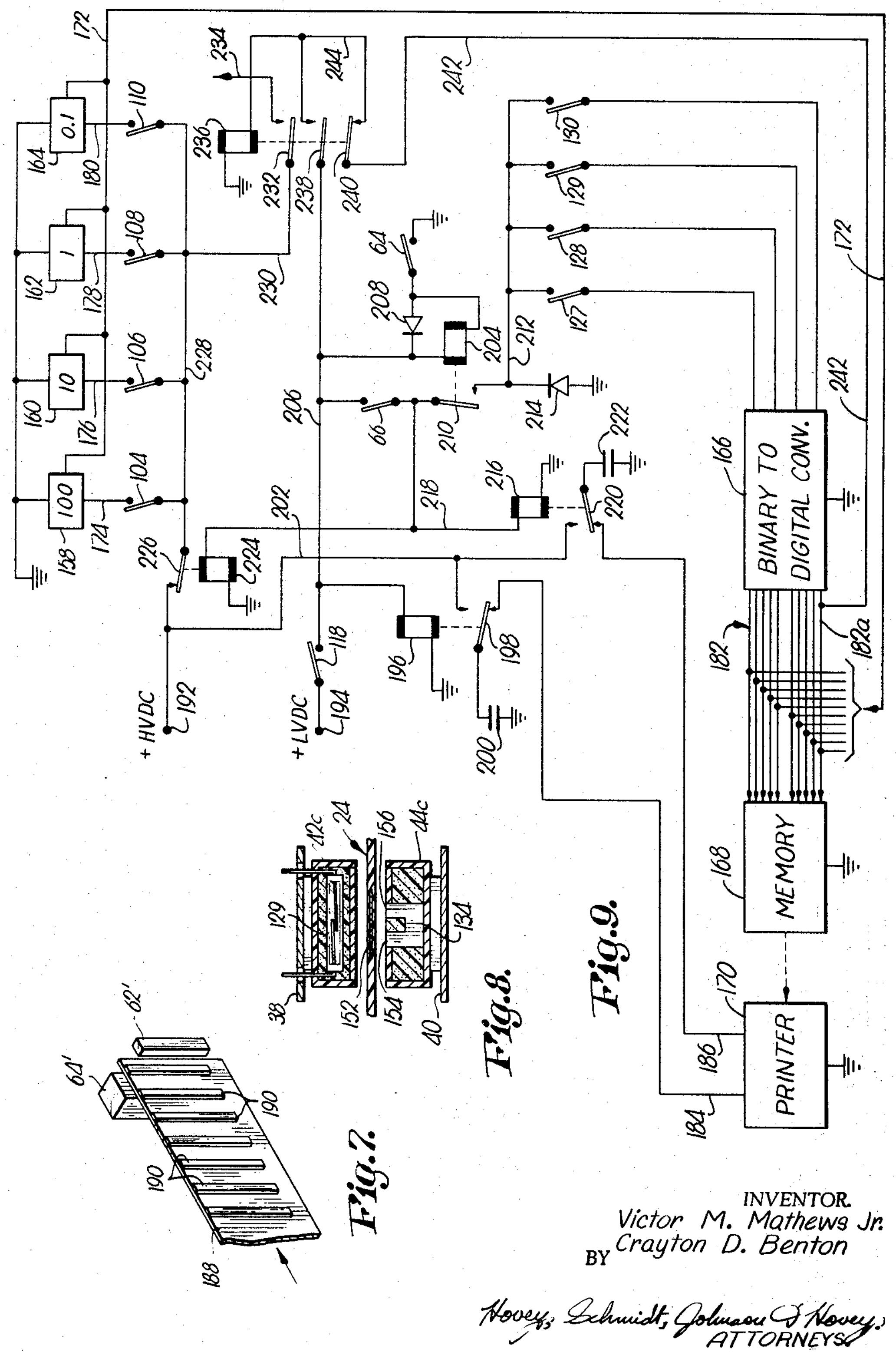
FIG. 7 is a diagrammatic illustration showing an alternative form of the aforesaid magnetic switch assembly.
FIG. 8 is an enlarged, diagrammatic, vertical sectional view through the read heads showing the card passing therebetween.
FIG. 9 is an electrical schematic and block diagram of the card reader circuitry incorporated into an information handling system for automatically dispensing a fluid product such as gasoline or fuel oil.

FIGURE 7 illustrates an alternative sequential switching arrangement which may be utilized in place of the reed switch 64, magnet 62, shield assembly 60, and associated components shown in FIGS. 1 and 3. A magnetically responsive reed switch 64' is spaced from a permanent bar magnet 62' and operable by the field thereof, switch 64' and magnet 62' being oriented with respect to carrier 12 such that the space therebetween defines a passage for a nonmagnetic sheet metal member 188 shiftable with carrier 12. Member 188 has a series of switch control elements 190 of magnetic material mounted thereon, such elements comprising ferrous metal strips spaced apart a predetermined distance to effect sequential operation of switch 64' in synchronism with movement of carrier 12. The direction of movement of member 188 as the tray is shifted through the read heads from the stand-by position shown, is illustrated in FIG. 7 by the arrow.

*The read heads and card*

Figure 5:
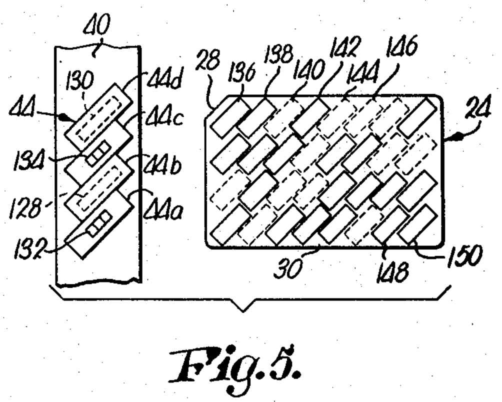
FIG. 5 is a diagrammatic illustration showing the card of the instant invention aligned with the lower read head prior to passage thereover.

In FIGS. 1 and 4, it may be seen that the two read heads 42 and 44 comprise a series of four elongated, rectangular capsules 42*a*, 42*b*, 42*c*, 42*d*, and 44*a*, 44*b*, 44*c*, 44*d*, respectively. FIGURE 5 illustrates the lower head 44 in diagrammatic form, and shows a pair of magnetically responsive reed switches 128 and 130 disposed in capsules 44*b* and 44*d* respectively. The other two capsules 44*a* and 44*c* contain U-shaped permanent magnets 132 and 134 respectively. It should be noted that the capsules are obliquely oriented with respect to the path of travel of carrier 12.

The two switches 128 and 130 are operated by magnets in the upper read head, magnets 132 and 134 serving to operate switches disposed in the upper head 42. Thus, capsules 42*a* and 42*c* contain magnetically responsive reed switches, while capsules 42*b* and 42*d* contain U-shaped, permanent magnets. Thus, each of the capsule pairs 42*a*–44*a*, 42*b*–44*b*, 42*c*–44*c*, and 42*d*–44*d* comprises a magnetically responsive sensing device for reading indicia on card 24 in a manner to be subsequently explained. At this juncture, however, it should be noted that the two head reed switches 128 and 130 are shown schematically in FIG. 9, the reed switches of capsules 42*a* and 42*c* being designated 127 and 129, respectively, in FIG. 9.

Card 24 is provided with a series of information-bearing zones which are sequentially read by the read heads during operation of the apparatus. Eight such zones are illustrated on card 24, the zones taking the form of parallel rows of information bit locations designated 136, 138, 140, 142, 144, 146, 148 and 150. Each row has four information bit locations which are represented in FIG. 5 by the full-line and dotted-line rectangles. The rectangles in full lines illustrate the presence of rectangular ferrous metal elements or tabs which are embedded in the card or carried thereby in any suitable fashion.

The four information locations of each row represent a four bit binary code. In the system shown herein, the presence of a ferrous metal element in a particular information location corresponds to the binary "0" bit, while the absence of a ferrous metal element at a given location corresponds to the binary "1" bit. Thus, if the information locations from top to bottom as viewed in FIG. 5 represent the binary code 1, 2, 4, 8; then row 136 represents the numeral 4, row 138 represents the numeral 8, row 140 represents the numeral 5, row 142 represents the numeral 6, row 144 represents the numeral 1, row 146 represents the numeral 9, row 148 represents the numeral 3, and row 150 represents the numeral 2. In commercial applications, the composite number could identify a particular customer or consumer, for example.

FIGURE 8 shows the relationship of the indicia-sensing device comprising switch 129 and magnet 134 and the card 24 during reading of the latter. FIGURE 8 is a vertical section along an obliquely disposed plane parallel with the longitudinal axes of capsules 42*c* and 44*c*. Card 24 is shown with a ferrous metal element 152 embedded therein and aligned with the two components of the magnetic sensor. It will be appreciated that the presence of a ferrous metal substance interferes with the normal effect of magnet 134 on switch 129. Element 152 decreases the reluctance of the air gap between magnet 134 and switch 129, thereby effectively shunting the magnetic field between the poles 154 and 156 of magnet 134. The various head reed switches 127–130 are held closed by their associated magnets when magnetic elements are not present in the air gap; thus, the presence of a magnetic element between a magnet and a switch of the read heads causes the switch to open. The manner in which this change of state causes the production of read signals will be explained when the operation of the apparatus is set forth hereinafter.

*The reader electrical circuitry and system application*

Referring to FIG. 9, the electrical circuitry of the reader is there shown in conjunction with a system for registering the dispensing of a product and identifying product consumption with a particular consumer. The apparatus shown is particularly adapted for use as a part of an automatic gasoline or fuel oil dispensing system. Counters 158, 160, 162 and 164 are utilized to register the quantity of the gasoline or fuel oil dispensed. Other basic components of the system include a binary to digital converter 166, a memory 168, and a printer 170.

The dispensing system employs a fuel delivery pump (not shown) having the above described card reader apparatus mounted therein. Front panel 126 (FIG. 2) of the reader would thus comprise an exterior wall of the pump, the card tray extending therefrom for operator access. The object of the system is to unlock a normally closed fuel delivery valve in the pump so that the operator may obtain fuel therefrom if such operator possesses a valid identification card and, additionally, it is the objective of the system to register the operator's identification number and the amount of fuel dispensed. Such a system has particular application in the transportation field for accounting purposes and as a means of regulating the usage of company vehicles by operating personnel. Each vehicle operator would possess an identification card acceptable by the card reader at the pump site. The system is especially adapted to accommodate the needs of the heavy trucking and hauling industries.

Counters 158–164 would be located at the pump site and operably coupled with the fuel delivery line to respond to the fuel gallonage delivered. As indicated in FIG. 9, counters 158–164 register the hundreds digit, tens digit, units digit and tenths of units, respectively, which comprise the gallonage figure. Each of the counters feeds a line 172 comprising ten conductors representing the ten digits of the decimal system. The counters have digital outputs which effect energization of an appropriate conductor of line 172, depending upon the quantity of fuel dispensed, and are conventional devices well known in the art. Each counter, for example, may comprise an electrical stepper which is operated in response to fuel delivery to sequentially couple the associated input lead 174, 176, 178, or 180 with the digital information conductors of line 172.

The binary to digital converter 166 is a four input logic device which receives read signals from the switches 127–130 of the read heads during card reader operation. Since binary to digital logic conversion is a technique well known in the art, the details of the converter will not be described in this specification. It should be noted that the converter output comprises ten digital leads 182 which are interconnected with the ten conductors of line 172 and coupled with the input of memory 168.

Memory 168 may comprise a conventional solenoid operated mechanical lister, or the lister portion of a mechanical accumulator or adding machine, such as manufactured by the Victor Comptometer Corporation of Chicago, Ill. Ten solenoids (not shown) are utilized to control the ten digits keys of the lister, such solenoids being coupled with respective digit leads 182. Listers of this type also include print-out means which could execute the function of printer 170, print out of the information stored in the memory being effected at predetermined times controlled by circuitry to be hereinafter described. The printing section of the lister is operated by a pair of solenoids (not shown) respectively coupled with leads 184 and 186 which operate the motor bar or printing key of the lister to read out the memory and print the stored information.

*Operation of the reader and the product dispensing system*

Referring first to FIG. 9, the positive terminals of a direct current source are illustrated at 192 and 194, the negative side of the DC source being illustrated by the ground symbol notation. Read switches 127–130 in the read heads are of the subminiature, close differential type. Thus, these switches have low current ratings and, therefore, are operated from a lower voltage DC supply than the other components of the system. For this reason, terminal 192 is illustrated as a high voltage supply terminal, while terminal 194 is represented as a low voltage supply terminal.

Operation commences upon placement of card 24 in its seated position within the card tray and manual advancement of the tray toward head heads 42 and 44. This is effected by shifting carrier 12 leftwardly as viewed in FIGS. 1 and 2. Before the tray reaches the heads, horizontal plate section 124 moves from between magnet 120 and switch 118. Switch 118 is a read switch of the normally open type which closes in the presence of a magnetic field of sufficient intensity. Therefore, when the magnetic shunt path presented by plate section 124 is no longer present between magnet 120 and switch 118, the field of the magnet effects closure of the switch and allows current to flow from terminal 194 to a relay coil 196. The associated relay switch 198 is shifted into engagement with its upper contact by energization of the coil to charge a capacitor 200 by the following circuit: from terminal 192, along lead 202 to switch 198, and thence through capacitor 200 to ground.

Subsequent to closure of switch 118 and prior to entry of the card into the space between the read heads, read switch 66 is closed by the action of rack 48 engaging dog 78. Switch 66 is also of the normally open type and closes under the action of magnet 68 upon engagement of dog 78 with projection 76 to raise member 70 to the position shown in FIG. 6. Closure of switch 66 makes power available to the read signal producing circuit which is sequentially operated by reed switch 64.

Reed switch 64 is of the normally closed type and is held open by the action of magnet 62 when carrier 12 is in the stand-by position. Since switch 64 is open when carrier 12 is in the stand-by position, this switch is shown in its open state in FIG. 9. As carrier 12 moves inwardly to position the card between the heads, rack 46 drives pinion 50 which, in turn, rotates shaft 52 to cause the shield components 60a–60d to revolve. It will be appreciated that, as each of the switch components pass between magnet 62 and switch 64, switch 64 is permitted to assume the closed position. The spacing of the shield components and the rack and pinion drive are so arranged that closure of switch 64 is effected sequentially as the rows 136–150 of bit locations on card 24 move into alignment between the heads. In this manner, the rows are sequentially scanned by the heads to determine the presence or absence of magnetic elements at the various bit locations. The widths of the shield components 60a–60d are selected so that switch 64 is closed only momentarily as each row is centered between the heads and in direct alignment with the opposed magnets and read switches thereof.

It may be noted in FIG. 5 that the magnets and the read switches of the heads are obliquely oriented with respect to the path of travel of carrier 12 and that the bit locations on card 24 are similarly oriented. Thus, the various rows of bit locations partially overlap one another and, furthermore, corresponding binary code locations of the rows form columns extending longitudinally of card 24 in which the various bit locations therein are also partially overlapped. The columns, of course, extend in parallelism with the path of travel of the carrier.

The oblique orientation of the bit locations not only enables a greater amount of information to be carried by a card of a given size, but also permits the utilization of a magnetic element representing the "0" bit of larger physical size than would otherwise be possible. This facilitates the positive detection of the presence of a magnetic element between the heads since such element must be of sufficient size to provide an effective shunt path across the poles of the particular head magnet. In this regard, reference is made to FIG. 8, wherein element 152 is shown at the instant switch 64 is momentarily closed to permit detection of any magnetic elements between the heads. In this connection, it should be noted that, assuming pole 154 of magnet 134 is the north pole thereof and pole 156 is the south pole of the magnet, the poles of all of the magnets would be so oriented such that all of the north poles would be located on one side of the heads, and all of the south poles on the other side. This further reduces interaction among the four magnets of the read heads.

When switch 64 momentarily closes, a relay coil 204 is energized along a path from terminal 194, through the now closed switch 118, and along lead 206 to coil 204 and ground via switch 64. A diode 208 is connected across coil 204 to serve as a transient suppressor.

Energization of coil 204 closes its associated relay switch 210 and permits current to flow to the four read head reed switches 127–130 along the following path: from terminal 194 through now closed switch 118, along lead 206 through closed switches 66 and 210, and then along lead 212 to the four switches 127–130 and the binary to digital converter 166. Thus, if any of the switches 127–130 are closed at the time a current pulse is available at lead 212, such pulse will be transmitted onto the input of the converter 166 through the closed switch or switches corresponding to the presence of a bit location which does not contain a ferrous metal element. The switches 127–130, therefore, are shown in FIG. 9 in their open positions corresponding to the presence of a row of bit locations between the heads containing four magnetic elements representing four "0" bits.

Continued advancement of carrier 12 effects scanning of the rows or zones of card 24 as discussed above, until carrier 12 reaches its final position with the tray fully inserted. At this time, dog 78 reaches the end 82 of rack 48 and is shifted in a clockwise direction, as viewed in FIG. 6, under the action of spring 80. This lowers member 70, effecting opening of switch 66, and prevents application of current pulses to lead 212 during withdrawal of the tray. The read signal producing circuit is, therefore, now de-energized.

Upon reaching the final position, pawl 84 hooks over the block 16 adjacent thereto and maintains carrier 12 at this position until subsequent release. Such release is effected by depressing knob 98 which, in turn, shifts ear 88 into engagement with lug 100 to raise the hooked tip of the pawl 84. It should be understood that during advancement of carrier 12 from the stand-by position to the final position, return movement of the carrier to the stand-by position was positively prevented by dog 78 engaging the teeth of rack 48. However, after the end 82 of the rack is shifted beyond dog 78, the latter moves over center under the action of spring 80 so that its engagement with rack 48 upon return movement of the carrier will not hinder such movement. In this manner, dog 78 and rack 48 form a ratchet mechanism which prevents withdrawal of the tray from between the heads until the carrier has been shifted to its final position, thereby precluding any possibility of misreading of the card or garbling of the intelligence obtained therefrom.

While switch 66 is closed during advancement of the carrier toward its final position, relay coil 216 is energized by a current path from lead 206 through switch 66 to lead 218. Energization of coil 216 shifts the associated relay switch 220 into engagement with its upper contact to charge capacitor 222 along a current path from terminal 192, along lead 202, and through switch 220 to the capacitor 222 and ground. Diode 214 between lead 212 and ground serves as a transient suppressor.

Closure of switch 66 also operates to energize a relay coil 224 to open its associated relay switch 226. Thus, switch 226 is held open during reading of the card.

When switch 66 opens as carrier 12 reaches its final position, it will be appreciated that relay switch 226 will return to its closed position and interconnect lead 228 with DC supply terminal 192. A lead 230 connects lead 228 with a normally open relay switch 232. A command signal line 234 is connected with the normally open contact of switch 232, the latter being operated by a relay coil 236. A normally open relay switch 238 and a normally closed relay switch 240 are also associated with relay coil 236 for operation thereby upon energization thereof. Therefore, it is apparent that current from terminal 192 will be made available at command line 234 upon closure of switch 226 if relay coil 236 has been previously energized.

Relay coil 236 and its associated switches condition the circuitry just described for production of a command signal at line 234 if the card inserted into the tray of the carrier contains predetermined coded indicia indicative of card validity. In the system of FIG. 9, a valid card is one that carries indicia representing the numeral 9 in one row thereof. In FIG. 5 it may be seen that row 146 forms the numeral 9 in binary code. Card 24, therefore, is valid and, when row 146 is read by the heads, will effect energization of the particular digit lead 182 connected to the output of the binary to digital converter 166 which carries the digit 9 impulse, such lead being designated 182*a* in FIG. 9.

The above energizes relay coil 236 as follows: from terminal 194 along lead 206 to closed switch 66, through closed switch 210 to lead 212, and through closed switches 127 and 130 to the associated inputs of converter 166, whereupon the converter provides an impulse appearing at lead 182*a* which is transmitted to memory 168 and via a parallel circuit along lead 242 to relay switch 240, and thence along lead 244 to relay coil 236 and ground. A holding circuit through relay switch 238 maintains coil 236 in the energized state as subsequent rows are read. Lead 242 is disconnected from relay coil 236 by the opening of switch 240, the relay switches 238 and 240 being preferably of the make-before-break type arranged so that switch 238 closes prior to the opening of switch 240.

The command signal at line 234 produced by energization of relay coil 236 and subsequent closing of relay switch 226, is utilized in the present system to unlock the fuel delivery valve of the supply pump so that the operator may fill the tank of his vehicle. At this time, the carrier 12 is maintained in its final position with the card tray fully inserted into the housing by the action of pawl 84. Also, at this time during the operational sequence, the opening of switch 66 has effected de-energization of relay coil 216, thereby returning its switch 220 to the position shown and permitting capacitor 222 to discharge along lead 186 to one of the solenoids of the printer 170. The consumer identification information in memory 168 is thus transferred therefrom and printed on a paper roll or the like in the printer.

When refueling is completed, the consumer depresses knob 98 to release the carrier and withdraws the same to its stand-by position. Card 24 may now be removed.

During return movement of the carrier, the information in the various counters or registers 158–164 is sequentially transferred to memory 168 along digital line 172. This is effected by the action of magnet 112 (FIG. 2) as the same is brought into proximal underlying relationship to reed switches 104, 106, 108 and 110. As these normally open switches sequentially close, current is made available from terminal 192 through switch 226 to the respective counters. Thus, the appropriate digital solenoids of memory 168 are sequentially energized by current flowing along lead 228, through the closed switch 104, 106, 108 or 110, along the corresponding lead 174, 176, 178 or 180, through the stepper of the associated counter, and thence along the appropriate digital conductor of line 172 to memory 168.

As the carrier approaches the stand-by position after the product consumption information has been transferred from the counters to the memory, switch 118 re-opens as plate section 124 enters the space between magnet 120 and switch 118, thereby de-energizing relay coil 196 and returning relay switch 198 to the position shown. This discharges capacitor 200 along lead 184 to energize the other print solenoid of printer 170 to read out the product consumption information in memory 168 and print the same.

As mentioned in the description of the system, memory 168 and printer 170 may comprise a conventional lister adapted for solenoid operation, or a commercially available solenoid operated lister; such equipment commonly prints on a paper feed roll and contains means for automatically advancing the roll subsequent to each printing operation so that the figures printed thereon appear in columnar form.

It may be noted that switch 94 is provided so that another control function may be effected upon release of the carrier by actuation of knob 98. This switch is included as a possible functional element of an operational system utilizing the card reader. For example, switch 94 in the system illustrated could serve to initiate appropriate circuitry (not shown) for relocking the fuel delivery valve prior to readout of counters 158–164 and removal of the card from the tray.

*Other applications of the card reader*

Besides the system illustrated in FIG. 9, it should be understood that the card reader is adaptable for utilization in a variety of other applications. For example, the reader could be employed in conjunction with a central station having a plug board containing a matrix that would prevent initiation of a command signal if a customer, having an unauthorized account, attempted to use the reader. In such an arrangement, of course, validity of a card would not be determined by the reader itself, but would be controlled by programing at the central station. Obviously, a system with converse logic could be utilized wherein only authorized accounts were set up on the matrix.

Other applications include the following:

(1) Utilization of the reader with a time clock mechanism to record the identification code of each employee and the time-in and the time-out at a central station.

(2) Incorporation of the reader into an automatic batch process sequence control system in which a number of cards would be provided representing particular processes. In a system of this type the information-bearing rows of the card would represent particular ingredients and the quantities thereof, as well as control the sequence of the process steps. Such a system could be utilized in soap batch control and applications in feed and flour mills.

(3) Utilization of the reader in the production of fully printed and/or punched sales slips which are directly printed or punched without an intervening manual step.

(4) Adaptation of the reader construction to include two sets of read heads, the additional set of heads being utilized to read a master card simultaneously with the reading of the card in the tray by the first set of heads. The master card would be employed to program the utilization of each row of information bit locations on the card in the tray. In this manner, particular portions of the card information could be routed to selected stations for use thereby depending on the particular system application.

Having thus described the invention, what is claimed as new and desired to be secured by Letters Patent is:

1. Apparatus for reading a card or the like having a series of information-bearing zones, each zone containing indicia comprising a portion of the total information carried by the card, said apparatus including:
- means for sensing the presence of said indicia;
- structure for receiving said card in disposition for detection of its information by said sensing means;
- means mounting said sensing means and said structure for relative movement along a path of travel to cause the zones of said card to be scanned in succession by said sensing means to thereby effect sequential detection of the information in said zones; and
- means operably coupled with said sensing means and responsive thereto for producing a series of read signals as said zones are scanned by said sensing means, whereby the information in said zones is read from the card,
- said signal-producing means including switching means operable in response to said relative movement for periodically momentarily conditioning the signal-producing means for production of said read signals contemporaneously with relative positioning of one structure and the sensing means for detection of the information in each of said zones,
- said switching means comprising a magnetically responsive, bistate switch, a magnet mounted in sufficiently closely spaced relationship to said switch to effect operation thereof, a shield of magnetic material, means mounting said shield for movement into and out of a disposition preventing substantial magnetic coupling of said magnet and said switch, and means responsive to said relative movement of the structure and the sensing means and coupled with said shield for cyclically shifting the latter to change the state of said switch in synchronism with said relative positioning of the structure and the sensing means for detection of the information in each of said zones.

2. The invention of claim 1, wherein is provided a memory coupled with said signal-producing means and responsive to said read signals for storing the information read from the card, and means responsive to completion of said scanning of the zones by said sensing means and operably coupled with said memory for effecting simultaneous readout of the information stored therein, whereby the information in the zones is sequentially read therefrom during said scanning thereof but transferred from the memory simultaneously.

3. The invention of claim 1, wherein is provided means operable to initiate a command signal, and means coupled with said read signal-producing means and said command signal initiating means for conditioning the latter for operation in response to production of a read signal having a predetermined characteristic.

4. The invention of claim 1, wherein is provided means operable to initiate a command signal in response to completion of said scanning of the zones by said sensing means, and means coupled with said read signal-producing means and said command signal initiating means for preventing operation of the latter at said completion of scanning except upon production of a read signal having a predetermined characteristic during said scanning.

5. In a reader for an information-bearing card containing magnetic indicia, a read head assembly comprising:
- a pair of spaced-apart heads;
- a device for sensing said indicia and comprising a pair of components carried by respective heads; and
- means mounting said heads for reception of said card in the space therebetween and with said components in opposing relationship to one another,
- one of said components comprising a magnetically responsive switch, the other component comprising a magnet disposed to operate the switch, whereby said switch is responsive to the presence of magnetic indicia between it and the magnet.

6. The invention of claim 5, wherein said switch is a reed switch.

7. In a reader for an information-bearing card adapted to contain magnetic indicia at a row of locations thereon, a read head assembly comprising:
- a pair of spaced-apart heads;
- a plurality of devices for sensing said indicia, each device comprising a pair of components carried by respective heads, the components of each head being arranged in a row corresponding to the row of locations of said card; and
- means mounting said heads for reception of said card in the space therebetween and with said rows of components in opposing relationship to one another,
- one of said components of each of said devices comprising a magnetically responsive, bistate switch, the other component of each device comprising a magnet disposed to operate the associated switch whereby, upon alignment of the row of locations of said card with said devices, each switch having magnetic indicia between it and the associated magnet will change its operational state.

8. The invention of claim 7, wherein like components of adjacent devices are carried by opposite heads, whereby to reduce interaction of the magnetic fields of the magnets.

9. The invention of claim 8, wherein each of said magnets presents opposing magnetic poles at opposite sides of the associated row of components, said magnets being disposed with like poles at the same side of both of the rows, whereby to further reduce interaction of the magnetic fields of said magnets.

10. For use with a card reader of the type described, a card provided with a series of information-bearing zones, each of said zones comprising a component of the total information carried by the card and having a row of information bit locations, the rows being arranged in parallelism with said locations disposed in parallel columns extending transversely of said rows, said locations extending obliquely with respect to said rows and said columns with the locations of adjacent rows and adjacent columns overlapping one another, there being magnetic elements representing information bits disposed in certain of said locations and adapted for detection by said reader, said certain locations being preselected to form said rows into said card information components.

11. In an information handling system:
- a card provided with a series of information-bearing zones, each of said zones comprising a component of the total information carried by the card and having a row of information bit locations, the rows being arranged in parallelism with said locations disposed in parallel columns extending transversely of said rows, there being elongated magnetic elements representing information bits disposed in certain of said locations and obliquely oriented with respect to said rows and said columns, said certain locations being preselected to form said rows into said card information components;

a pair of spaced-apart read heads;

a plurality of devices for sensing said elements, each device comprising a pair of components carried by respective heads, the components of each head being arranged in a row and obliquely oriented to correspond to the geometry of each of the rows of said card; and means mounting said heads for reception of said card in the space therebetween and with said rows of components in opposing relationship to one another, one of said components of each of said devices comprising a magnetically responsive, bistable switch, the other component of each device comprising a magnet disposed to operate the associated switch whereby, upon sequential alignment of the rows of locations of said card with said devices, each switch having a magnetic element between it and the associated magnet will change its operational state.

12. Apparatus for reading a card or the like having a series of information-bearing zones, each zone containing indicia comprising a portion of the total information carried by the card, said apparatus including:

a pair of read heads;

means mounting said heads in opposing, spaced relationship to one another, the heads being responsive to the presence of said indicia in the space therebetween;

a carrier having a tray for receiving said card with said zones thereof in a predetermined positional orientation relative to said heads;

means mounting said carrier for reciprocation between a stand-by position, where the tray is clear of the heads and disposed for placement of said card therein, and a final position along a path of travel wherein said tray moves through said space, whereby the heads scan said zones during movement of the carrier from said stand-by position to said final position thereof;

a source of electrical power;

electrical operable means coupled with said heads and responsive thereto for producing a series of read signals as said zones are scanned by the heads; and circuit means coupling said source with said signal-producing means for supplying electrical energy thereto, and including first switching means coupled therein and disposed for actuation by said carrier to condition the signal-producing means for operation upon movement of the tray toward said heads from said stand-by position to said final position and during the time that the tray moves through said space between the heads, said signal-producing means including second switching means for controlling operation of the signal-producing means upon operative conditioning thereof by said first switching means, and synchronous actuator means operably intercoupling said carrier and said second switching means for periodically momentarily actuating the latter to activate the signal-producing means as said heads become aligned with each of the zones of said card during movement of the tray through said space and to said final position.

13. The invention of claim 12, wherein said first switching means comprises a magnetically responsive, bistate switch, a magnet mounted in sufficiently closely spaced relationship to said switch to effect operation thereof, a member of magnetic material, means shiftably mounting said member for movement into and out of a disposition preventing substantial magnetic coupling of the magnet and the switch, and means coupled with said member and engageable with said carrier for shifting the member to change the state of said switch upon said movement of the tray toward the heads from said stand-by position.

14. The invention of claim 12, wherein said second switching means comprises a magnetically responsive, bistate switch and a magnet mounted in sufficiently closely spaced relationship to said switch to effect operation thereof, said synchronous actuator means comprising a shield of magnetic material, means mounting said shield for movement into and out of a disposition preventing substantial magnetic coupling of said magnet and said switch, and a rack and pinion drive coupled with said shield for cyclically shifting the latter to change the state of said switch in synchronism with alignment of said heads with each of said zones, the rack being mounted on the carrier and shiftable therewith during movement of the tray through said space.

15. The invention of claim 12, wherein said second switching means comprises a magnetically responsive, bistate switch, and a magnet mounted in sufficiently closely spaced relationship to said switch to effect operation thereof, said synchronous actuator means comprising a nonmagnetic member shiftable with the carrier and disposed for movement along a path of travel adjacent said magnet during movement of the tray through said space, and a series of switch control elements of magnetic material carried by said member and each movable therewith to a disposition preventing substantial magnetic coupling of the magnet and the switch, adjacent elements being spaced apart a distance to change the state of said switch in synchronism with alignment of the heads with each of said zones.

16. The invention of claim 12, wherein is provided a ratchet mechanism coupled with said carrier for preventing return movement thereof to said stand-by position while the tray is between the heads during advancement of the carrier toward said final position, said mechanism operating to release the carrier when the latter reaches said final position, a pawl engageable with said carrier for maintaining the latter in said final position, and means disposed for engagement with said pawl to shift the latter in a direction to disengage the pawl from the carrier, whereby to permit return movement of the carrier to said stand-by position.

17. In a product-dispensing system, apparatus for reading a consumer identification card or the like having a series of information-bearing zones containing indicia identifying the consumer, and for recording said identification information and product consumption information, said apparatus comprising:

a pair of read heads;

means mounting said heads in opposing, spaced relationship to one another, the heads being responsive to the presence of said indicia in the space therebetween;

a carrier having a tray for receiving said card with said zones thereof in a predetermined positional orientation relative to said heads;

means mounting said carrier for reciprocation between a stand-by position, where the tray is clear of the heads and disposed for placement of said card therein, and a final position along a path of travel wherein said tray moves through said space, whereby the heads scan said zones during movement of the carrier from said stand-by position to said final position thereof;

a source of electrical power;

electrically operable means coupled with said heads and responsive thereto for producing a series of read signals as said zones are scanned by the heads;

circuit means coupling said source with said signal producing means for supplying electrical energy thereto, and including first switching means coupled therein and disposed for actuation by said carrier to condition the signal-producing means for operation upon movement of the tray toward said heads from said stand-by position, said signal-producing means including second switching means for controlling operation of the signal-producing means upon operative conditioning thereof by said first switching means, and synchronous actuator means operably intercoupling said carrier and said second switching means for periodically momentarily actuating the latter as said heads become aligned with each of the zones of said card;

a memory having an input coupled with the output of said signal-producing means, whereby to store the information read from the card;

means operably associated with said carrier and said first switching means for operating the latter to de-energize said signal-producing means when the carrier reaches said final position thereof;

means coupled with said memory and said first switching means and responsive to the latter for effecting simultaneous readout of the consumer identification information stored in the memory upon said de-energization of the signal-producing means;

means coupled with said memory and responsive thereto for recording information read therefrom;

means for registering said product consumption information;

second circuit means intercoupling said input of the memory and said registering means and operable to transfer information from the registering means to the memory upon excitation of the said second circuit means;

third switching means disposed for actuation by said carrier and operably coupled with said source means and said second circuit means for energizing the latter to effect transfer of the product consumption information to said memory during return movement of the carrier to said stand-by position; and fourth switching means disposed for actuation by said carrier during said return movement thereof and subsequent to actuation of said third switching means, and coupled with said memory for effecting simultaneous readout of the product consumption information stored therein, whereby said consumer identification information and said product consumption information is recorded by said recording means.

18. The invention of claim 17, wherein said registering means comprises a plurality of registering sections, said third switching means including a plurality of switches operably associated with respective sections and disposed for sequential operation by said carrier during movement thereof whereby, during said return movement of the carrier, the switches are sequentially operated thereby to effect sequential transfer of said information from said sections to the memory.

19. Apparatus for reading a card or the like having a series of information-bearing zones, each zone containing indicia comprising a portion of the total information carried by the card, said apparatus including:

means for sensing the presence of said indicia;

structure for receiving said card in disposition for detection of its information by said sensing means;

means mounting said sensing means and said structure for relative movement along a path of travel to cause the zones of said card to be scanned in succession by said sensing means to thereby effect sequential detection of the information in said zones; and means operably coupled with said sensing means and responsive thereto for producing a series of read signals as said zones are scanned by said sensing means, whereby the information in said zones is read from the card, said signal-producing means including switching means operable in response to said relative movement for periodically momentarily conditioning the signal-producing means for production of said read signals contemporaneously with relative positioning of the structure and the sensing means for detection of the information in each of said zones, said switching means comprising a magnetically responsive, bistate switch, a magnet mounted in sufficiently closely spaced relationship to said switch to effect operation thereof, a nonmagnetic member disposed for movement along a path of travel adjacent said magnet in response to said relative movement of the structure and the sensing means, and a series of switch control elements of magnetic material carried by said mmeber, and each movable therewith to a disposition preventing substantial magnetic coupling of the magnet and the switch, adjacent elements being spaced apart a distance to change the state of said switch in synchronism with said relative positioning of the structure and the sensing means for detection of the information in each of said zones.

References Cited

UNITED STATES PATENTS

| | | | |
|---|---|---|---|
| 2,690,222 | 9/1954 | Wilson et al. | 235—61.11 X |
| 2,967,916 | 1/1961 | Williams | 200—46 X |
| 3,131,259 | 4/1964 | Di Iorio et al. | 235—61.11 X |
| 3,184,714 | 5/1965 | Brown et al. | 235—61.11 X |
| 3,198,897 | 8/1965 | Scofield et al. | 200—46 |
| 3,328,541 | 6/1967 | Ryno et al. | 200—46 |

MAYNARD R. WILBUR, *Primary Examiner.*

ROBERT M. KILGORE, *Assistant Examiner.*

U.S. Cl. X.R.

200—46; 335—153, 206, 207